March 1, 1932.  E. JENKINS  1,847,652
HEADLIGHT ADJUSTING DEVICE
Filed Nov. 2, 1928   2 Sheets-Sheet 1
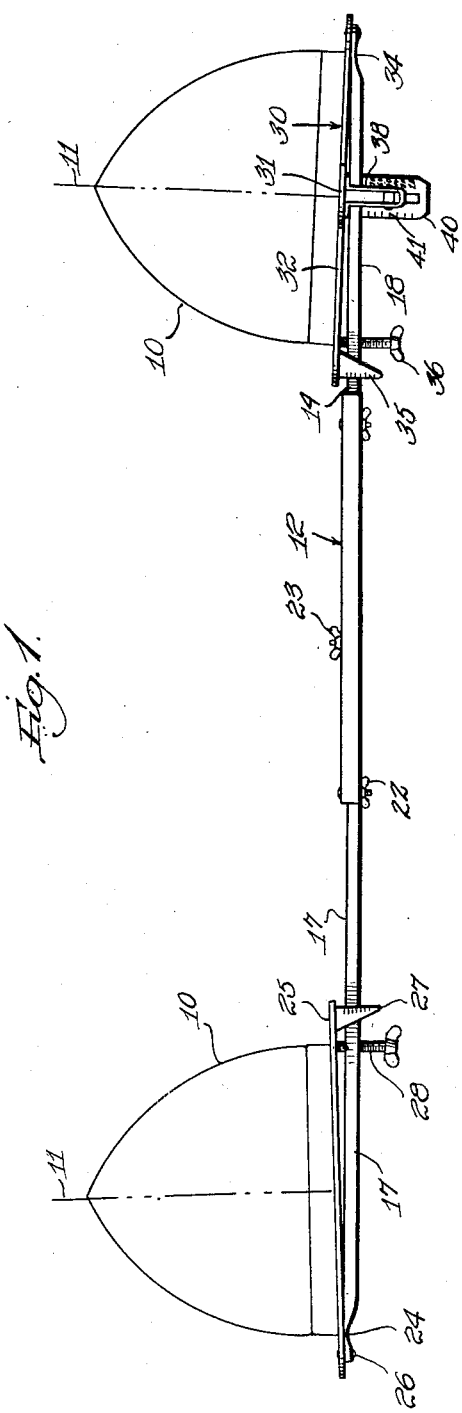
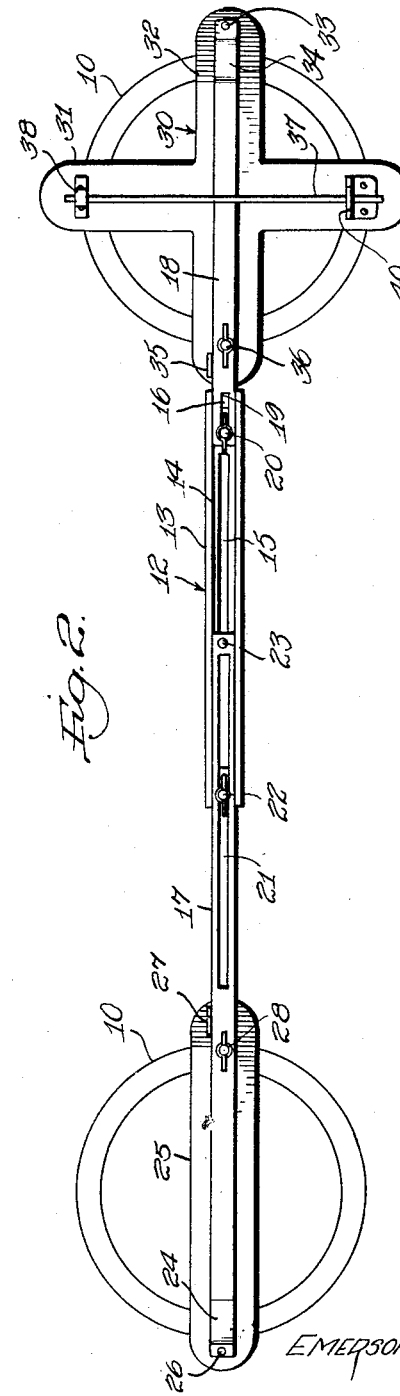
Inventor
EMERSON JENKINS
By C. L. Parker Jr.
Attorney March 1, 1932. 　　　　E. JENKINS 　　　　1,847,652
HEADLIGHT ADJUSTING DEVICE
Filed Nov. 2, 1928 　　　2 Sheets-Sheet 2
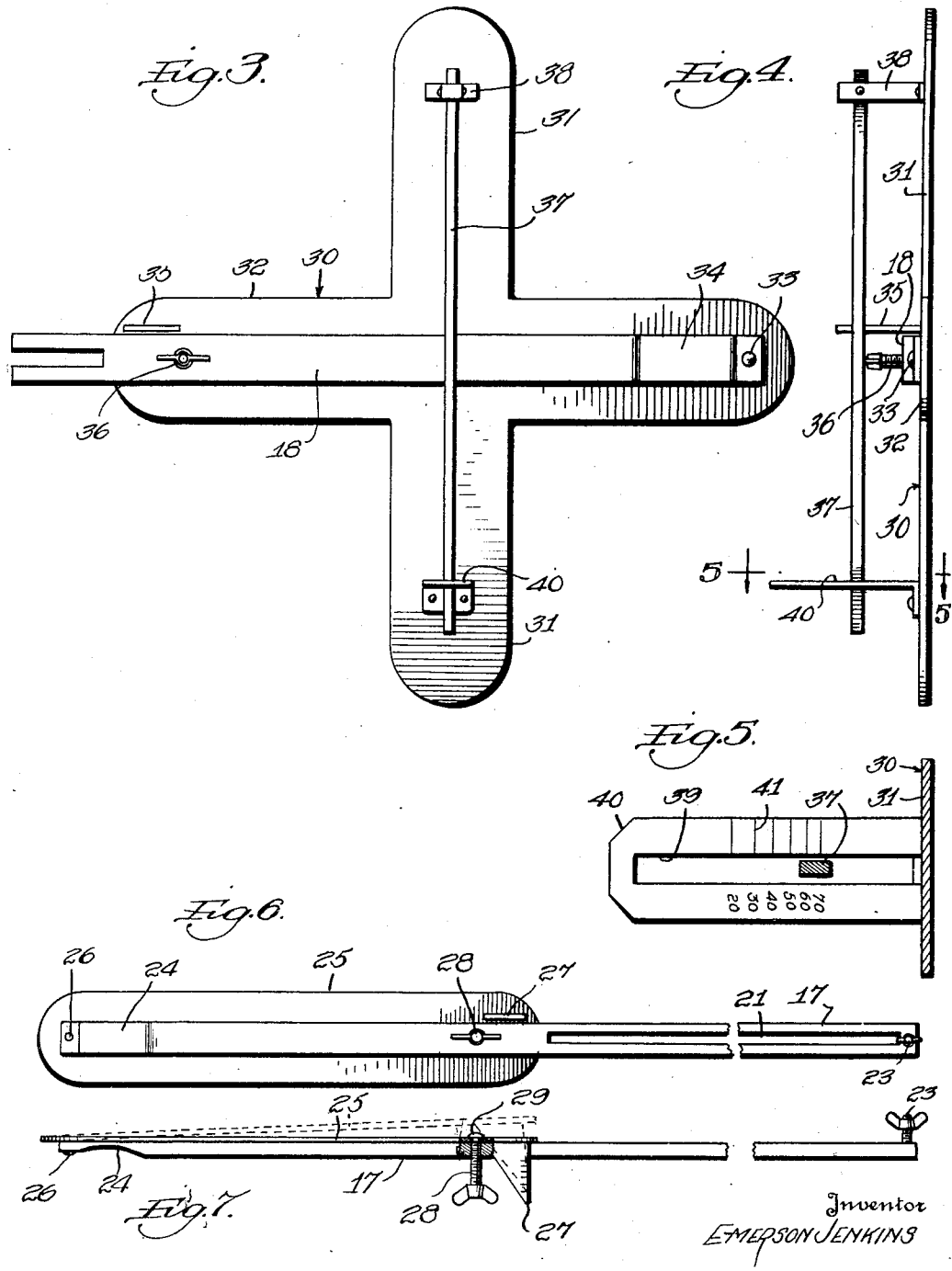

Patented Mar. 1, 1932

1,847,652

UNITED STATES PATENT OFFICE

EMERSON JENKINS, OF DANVILLE, ILLINOIS

HEADLIGHT ADJUSTING DEVICE

Application filed November 2, 1928. Serial No. 316,828.

This invention relates to adjusting devices for automobile headlights.

In order to furnish the most efficient illumination and to comply with various State headlight requirements, it is necessary that headlights be properly adjusted and that the beams thereof be properly directed forwardly of the vehicle. For example, the upper limits of the headlight beams should strike the highway a given distance in front of the vehicle in order that sufficient distant illumination may be provided without causing glare in the eyes of approaching drivers. It also if necessary that the axes of the headlights converge slightly toward each other forwardly of the vehicle in order that the two beams may converge to evenly and properly illuminate the road.

An important object of the present invention is to provide novel means for properly converging the axes of the headlights of a motor vehicle.

A further object is to provide novel means adapted to be placed in position against both of the headlights of a motor vehicle and operative to permit the axes of the lights to be arranged at the proper converging angle.

A further object is to provide a device of the above mentioned character which may be employed for determining the proper inclination of a headlight with respect to the horizontal to permit its beam to strike the highway at the proper distance in front of the vehicle.

A further object is to provide a novel device of the character referred to which permits the proper inclination of the headlights to be found together with the proper angle of convergence without requiring that the operation be performed in the dark, or in a relatively long room which ordinarily is employed, together with a screen against which the rays of light from the headlights are projected.

Other objects and advantages of the invention will become apparent during the course of the following description.

In the drawings I have shown one embodiment of the invention. In this showing,

Figure 1 is a plan view showing the device in position against a pair of headlights, Figure 2 is a front elevation of the same, Figure 3 is an enlarged front elevation of one end of the device, Figure 4 is an enlarged side elevation of the same, Figure 5 is a detail section on line 5—5 of Figure 4, Figure 6 is an enlarged front elevation of the other end of the device, parts being broken away, and, Figure 7 is a plan view of the same.

Referring to Figures 1 and 2, the numeral 10 designates a pair of standard headlights employed on motor vehicles, the axes of the lights being indicated by the broken lines 11. In practice, it is required for the reasons stated above, that the axes 11 be inclined downwardly at a slight angle toward the front of the headlights, and that the axes converge slightly toward each other.

The numeral 12 designates a connecting member provided with longitudinal flanges 13 forming a channel 14, for a purpose to be described. The connecting member is provided centrally thereof with a slot 15 which terminates at points spaced from the ends of the connecting member. One end of the connecting member is provided within the channel thereof with an outstanding lug 16 arranged in alinement with the slot 15.

A pair of shanks 17 and 18 are arranged with their inner ends disposed within the channel 14, the shank 17 being substantially longer than the shank 18, as clearly shown in Figure 2. The shank 18 is provided in its inner end with a slot 19 receiving the lug 16, while a bolt 20 extends through the slot 19 and through the adjacent end of the connecting member 12 to permit the latter to be secured to the shank 18.

The shank 17 is provided with an elongated slot 21 in which a bolt 22 is slidable, this bolt being mounted in the adjacent end of the connecting member 12. A similar bolt 23 passes through the inner end portion of the shank 17, and through the slot 15. The bolts 20, 22 and 23 are preferably provided with wing nuts as shown in Figures 1 and 2, to facilitate the operation and adjustment of the device.

Adjacent its free end, the shank 17 is provided with a relatively thin portion 24, possessing a substantial degree of resiliency, for a purpose to be described. A plate 25 is adapted to be arranged across and against the front of the adjacent headlight and is riveted or otherwise secured at its outer end, as at 26, to the extremity of the shank 17. The resilient portion 24 of the shank is provided to permit the latter to assume an angular position with respect to the plate 25.

A scale 27 is carried by the inner end of the plate 25 and projects outwardly across the shank 17. This scale is suitably calibrated to indicate the angle of inclination between the plate 25 and shank 17, as will be apparent. A thumb screw 28 is threaded in the shank 17 and is adapted to move the plate 25 toward and away from the shank. As shown in Figure 7, the screw 28 is provided with a reduced portion extending through the plate 25, and the inner extremity of the screw is riveted over as at 29. The reduced portion of the screw fits loosely through the opening in the plate 25 to permit the latter to assume various adjusted positions.

Adjacent the opposite end of the device is arranged a plate indicated as a whole by the numeral 30. This plate is substantially cross shaped and includes a vertical portion 31 and a horizontal portion 32, the latter being identical with the plate 25 previously described. The shank 18 is riveted as at 33, or otherwise secured to the outer extremity of the horizontal portion of the plate 30, and adjacent its end, the shank 18 is reduced in thickness as at 34 to provide sufficient resiliency to permit the shank 18 and plate 30 to assume angular positions with respect to each other. The plate 30 also is provided with a scale 35, similar to the scale 27, and the shank 18 and plate 30 are angularly adjustable with respect to each other by operation of a screw 36 identical with the screw 28 previously described.

A plumb device is employed for indicating the tilt of the headlight axis from the vertical. As shown in detail in Figures 3, 4 and 5, this device includes an arm 37 pivotally connected at its upper end to a bracket 38 carried by the upper end of the vertical portion 31 of the plate 30. The lower end of the arm 37 moves in a slot 39 formed in a guide 40 (see Figure 5) and the guide 40 is calibrated as at 41 to indicate the relative inclination of the plate 30 from the vertical.

The operation of the device is as follows: The parts are assembled as shown in Figures 1 and 2, and the plates 25 and 30 are arranged against the outer faces of the headlights while the latter are in place on a vehicle. The sliding connections between the connecting member 12 and the shanks 17 and 18 are provided to permit the device to be adjusted according to the distance between the headlights of the vehicle. By loosening the screws 20, 22 and 23, it will be apparent that the elements referred to may slide with respect to each other to permit the device to be properly arranged with respect to the headlights. The channel 14 provided in the connecting member 12 prevents vertical swinging movement of the parts referred to whereby they are fixed in alinement with each other.

The angle of convergence of the axes of the headlights depends upon the distance between the axes, and this angle readily can be found for a given pair of headlights. Having determined the angle, it merely is necessary to adjust the screws 28 and 36 and to arrange the headlights with their outer faces flat against the plates 25 and 32. This convergence of the lights causes the beams thereof to intersect at the proper distance forwardly of the vehicle.

The inclination of the axis of an automobile headlight from the horizontal depends upon the height of the headlight above the roadway, and this angle of inclination also can be readily determined for any given headlight. Having determined this angle, the headlight is tilted until the arm 37 indicates the proper angle on the scale 41. The inclination of the axis of the left hand headlight of the vehicle can be obtained with the entire device assembled in the manner previously stated. In order to similarly adjust the other headlight, the wing nut of the screw 20 is removed, thus detaching the shank 18 from the connecting member 12. The plate 30 then may be arranged against the outer face of the right hand headlight, whereupon a similar angle of inclination may be determined.

The proper distribution of light from the lamps of course depends upon proper focusing of the filaments, but the adjustment for focusing may be accomplished without the use of a relatively long room by projecting the beam against a wall and adjusting the focusing device of the lamp until the sharpest image is obtained. By properly focusing the bulbs and adjusting the inclination and convergence of the lights, as above described, proper illumination of the roadway will be accomplished without projecting a blinding flare into the eyes of approaching drivers. Thus it will be apparent that the device may be employed for easily and accurately adjusting headlights without the provision of a special relatively long room or the like, such as is commonly employed.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a straight body portion adapted to extend between a pair of vehicle headlights parallel to a vertical plane coinciding with the forward extremities of the headlights, an elongated member connected at one end to said body portion and adapted to be arranged flat against the outer face of one headlight, said body portion adjacent its point of connection with said member being resilient to permit the latter to assume angular positions with respect to said body portion, and means connected between said body portion and the opposite end of said member for varying the angular relationship between said member and said body portion.

2. A device of the character described comprising a straight body portion adapted to extend between a pair of vehicle headlights parallel to a vertical plane coinciding with the forward extremities of the headlights, an elongated member connected at one end to said body portion and adapted to be arranged flat against the outer face of one headlight, said body portion adjacent its point of connection with said member being resilient to permit the latter to assume angular positions with respect to said body portion, and means for indicating the angular relationship between said member and said body portion.

3. A device of the character described comprising a straight body portion adapted to extend between a pair of vehicle headlights parallel to a vertical plane coinciding with the forward extremities of the headlights, an elongated member connected at one end to said body portion and adapted to be arranged flat against the outer face of one headlight, said body portion adjacent its point of connection with said member being resilient to permit the latter to assume angular positions with respect to said body portion, means connected between said body portion and the opposite end of said member for varying the angular relationship between said member and said body portion, and means for indicating the angle of said member to the vertical.

4. A device of the character described comprising an elongated body portion adapted to extend between a pair of headlights of a vehicle, a member carried at each end of said body portion, each member being adapted to lie flat against the forward face of an adjacent headlight, and means for indicating the angular relationship between each of said members and said body portion.

5. A device of the character described comprising an elongated body portion adapted to extend between a pair of headlights of a vehicle, a member carried at each end of said body portion, each member being adapted to lie flat against the forward face of an adjacent headlight, and means for varying the angular relationship between each of said members and said body portion.

6. A device of the character described comprising an elongated body portion adapted to extend between a pair of headlights of a vehicle, a member carried at each end of said body portion, each member being adapted to lie flat against the forward face of an adjacent headlight, means for indicating the angular relationship between each of said members and said body portion, and means for varying the angular relationship of each of said members and said body portion.

7. A device of the character described comprising a straight body portion adapted to extend between a pair of vehicle headlights transversely of the vehicle, a plate connected to each end of said body portion, each plate being adapted to be arranged transversely of a headlight against the outer face thereof, and means for varying the angular relationship between each plate and said body portion.

8. A device of the character described comprising a straight body portion adapted to extend between a pair of vehicle headlights transversely of the vehicle, a plate connected to each end of said body portion, each plate being adapted to be arranged transversely of a headlight against the outer face thereof, means for varying the angular relationship between each plate and said body portion and means for indicating such angular relationship.

9. A device of the character described comprising a straight body portion adapted to extend between a pair of vehicle headlights parallel to a vertical plane coinciding with the forward extremities of the headlights, a pair of elongated members each connected solely at one end to opposite ends of said body portion, each member being adapted to be arranged flat against the outer face of a headlight, and means connected between said body portion and other end of each of said members for varying the angular relationship between said members and said body portion.

10. A device constructed in accordance with claim 9 wherein said body portion adjacent its points of connection with said members is resilient to permit the members to assume angular positions with respect to said body portion, and means for indicating the angular relationship between each of said members and said body portion.

11. A device of the character described comprising an elongated body portion adapted to extend between a pair of vehicle headlights, a pair of members carried adjacent the ends of said body portion, each of said members being adapted to lie flat against the forward face of a headlight, means for indicating the horizontal angular relationship between each of said members and said body portion, and means for indicating the angle of at least one of said members to the vertical.

12. A device of the character described comprising an elongated body portion adapted to extend between a pair of vehicle headlights, a pair of members carried adjacent the ends of said body portion, each of said members being adapted to lie flat against the forward face of a headlight, means for varying the horizontal angular relationship between each of said members and said body portion, and means for indicating the angle of at least one of said members to the vertical.

13. A device of the character described comprising a straight body portion adapted to extend between a pair of vehicle headlights parallel to a vertical plane coinciding with the forward extremities of the headlights, a pair of elongated plates each connected solely at one end to the ends of said body portion, each plate being adapted to be arranged flat against the outer face of a headlight, means connected between said body portion and the other end of each plate for varying the angular relationship between said plates and said body portion, and means for indicating the angle of at least one of said plates to the vertical.

14. A device of the character described comprising an extensible body portion adapted to be maintained in ascertained relationship to both headlights of a vehicle, a member carried by said body portion and adjustable with respect thereto and adapted to contact and stand in parallelism with the frontal surface of an adjacent headlight, and means for indicating the angular relationship between the body portion and said member when the latter is in contact with the headlight.

15. A device of the character described comprising an extensible body portion adapted to extend between a pair of headlights of a vehicle, a member carried by said body portion and adjustable with respect thereto and adapted to contact and stand in parallelism with the frontal surface of an adjacent headlight, and means for indicating the angular relationship between the body portion and said member when the latter is in contact with the headlight.

16. A device of the character described comprising a body portion adapted to be maintained in ascertained relationship to both headlights of a vehicle, a member carried by said body portion and adjustable with respect thereto and adapted to contact and stand in parallelism with the frontal surface of an adjacent headlight, means for indicating the angular relationship between the body portion and said member when the latter is in gauging contact with the headlight, and means for moving said member into contact with the headlight.

17. A device of the character described comprising a body portion adapted to extend between a pair of headlights of a vehicle, a member carried by said body portion and adjustable with respect thereto and adapted to contact and stand in parallelism with the frontal surface of an adjacent headlight, means for indicating the angular relationship between the body portion and said member when the latter is in gauging contact with the headlight, and means for moving said member into contact with the headlight.

18. A device of the character described comprising a body portion adapted to extend between the separated headlights of a vehicle, a member carried by said body portion and adjustable with respect thereto and adapted to contact and stand in parallelism with the frontal surface of an adjacent headlight, means for indicating the angular relationship between the body portion and said member when the latter is in contact with the headlight, and means adjustable with relation to the body portion for indicating the position of the latter with respect to the vertical when in contact with the headlight.

In testimony whereof I affix my signature.

EMERSON JENKINS.